(12) United States Patent
Gugliotta et al.

(10) Patent No.: US 7,762,079 B2
(45) Date of Patent: Jul. 27, 2010

(54) PROCEDURE FOR CONTROLLING THE USEFUL LIFE OF THE GAS TURBINES OF A PLANT

(75) Inventors: Giuseppe Gugliotta, Pisa (IT);
Giuseppe Nuzzi, Florence (IT);
Vincenzo Corzi, Florence (IT)

(73) Assignee: Nuovo Pignone Holding S.p.A., Florence (IT)

( * ) Notice: Subject to any disclaimer, the term of this patent is extended or adjusted under 35 U.S.C. 154(b) by 1025 days.

(21) Appl. No.: 10/595,992

(22) PCT Filed: Nov. 25, 2004

(86) PCT No.: PCT/EP2004/013403

§ 371 (c)(1),
(2), (4) Date: May 24, 2006

(87) PCT Pub. No.: WO2005/052341

PCT Pub. Date: Jun. 9, 2005

(65) Prior Publication Data

US 2008/0314046 A1 Dec. 25, 2008

(30) Foreign Application Priority Data

Nov. 27, 2003 (IT) .......................... MI2003A2324

(51) Int. Cl.
*F02C 1/00* (2006.01)
(52) U.S. Cl. ....................................................... 60/772
(58) Field of Classification Search ................ 60/39.15, 60/772, 225; 702/182–184
See application file for complete search history.

(56) References Cited

U.S. PATENT DOCUMENTS

| 6,158,207 | A | 12/2000 | Polenick et al. |
| 7,114,351 | B2 * | 10/2006 | Jones et al. .................. 62/611 |

FOREIGN PATENT DOCUMENTS

| JP | 59-138732 A | 8/1984 |
| JP | 59138732 | 8/1984 |
| JP | 2786281 A | 8/1991 |
| JP | 10-062313 A | 3/1998 |
| JP | 11-141309 A | 5/1999 |
| JP | 2002-195056 A | 7/2002 |
| JP | 2002-221003 A | 8/2002 |

* cited by examiner

*Primary Examiner*—Michael Cuff
*Assistant Examiner*—Andrew Nguyen
(74) *Attorney, Agent, or Firm*—Potomac Patent Group PLLC

(57) ABSTRACT

A method for controlling the useful life of gas turbines of a production plant includes a) creating a succession of gas generator groups of gas turbines to be subjected to maintenance, b) substituting a first gas generator group of gas turbines of the succession with an auxiliary gas generator group, c) inspecting the first substituted gas generator group of gas turbines, d) substituting a second gas generator group of gas turbines of the succession with the first verified gas generator group of gas turbines, e) inspecting the second substituted gas generator group of gas turbines, and f) repeating steps b), c) d) and e) for all the gas generator groups of gas turbines of the succession.

9 Claims, 5 Drawing Sheets

PROCEDURE FOR CONTROLLING THE USEFUL LIFE OF THE GAS TURBINES OF A PLANT

The present invention relates to a procedure for controlling the useful life of the gas turbines of a plant.

In particular, the present invention relates to a procedure suitable for optimizing the useful life of gas turbines used in plants such as, for example, thermoelectric stations, refineries and plants for the production of liquefied gas.

For the pure sake of descriptive simplicity the pre-sent invention refers to a plant for the production of liquefied gas without restricting the generality of the invention itself.

Production plants for the liquefaction of natural gas currently use several production trains, each consisting of two or three groups of gas turbines.

Each gas turbine group is, in turn, made up of a series of gas turbines, and can produce by compressing natural gas.

The gas turbines which form these groups are called "heavy duty" gas turbines and are specifically designed and manufactured for industrial use.

Heavy duty gas turbines have a solid, strong structure which are highly reliable for the plant.

Heavy duty gas turbines are machines which comprise a compressor connected by a rotating shaft to a turbine with one or more steps, and where a combustion chamber is envisaged between the compressor and the turbine.

These gas turbines are distinguished by their considerable weight which greatly conditions maintenance operations, making them onerous in terms of both cost and time.

Due to the high reliability of these machines, the most importance maintenance relates to ordinary operations, extraordinary maintenance interventions of the production plant are, in fact, considerably reduced thanks to their great reliability.

More specifically, ordinary maintenance comprises both normal inspection phases of the functioning state of each turbine, and also dismantling phases of the gas turbines, in which worn parts or components during the plant functioning, are substituted.

The current dismantling phase of the gas turbines of a production train causes a considerable reduction in the plant productivity.

Due to the structural complexity of the plant, it is in fact necessary to stop the whole production train to be subjected to maintenance and effect the maintenance of all the gas turbines of said train.

The overall plant production is therefore reduced by a quantity equal to the daily production of the train multiplied by the number of days necessary for the entire maintenance of the train.

Another disadvantage of the known procedures and production plants is that the production on each train is further reduced by the set up times necessary for bringing the train-back to regime.

Furthermore, by using the known heavy duty gas turbines, the dismantling operations to effect the maintenance of the single turbine are difficult and onerous, both in terms of cost and time, as a specific result, as mentioned above, of their weight and hindrance.

This means that the maintenance times are high and consequently the stoppage of a whole train for maintenance represents a great loss in the plant productivity.

An objective of the present invention is to provide a procedure for controlling the useful life of the gas turbines of a plant, which is simple and economical and which allows the plant productivity to be increased, at the same time maintaining the same guarantees and reliability.

Yet another objective of the present invention is to provide a procedure for controlling the useful life of the gas turbines of a plant which reduces the interruption times of the production, necessary for effecting ordinary maintenance operations.

These and other objectives according to the present invention are achieved by providing a procedure for controlling the useful life of the gas turbines of a plant as specified in claim 1.

Further characteristics of the invention are illustrated in the subsequent claims.

Substantially, a procedure for controlling the useful life of the gas turbines of a plant by means of a production plant comprising a series of production trains and an auxiliary group of gas turbines, wherein each production train is equipped with a series of groups of gas turbines for liquefying gas, by compression, according to the present invention, is characterized in that it comprises the following steps:

a) creating a succession of groups of gas turbines to be subjected to maintenance;

b) substituting the first group of gas turbines of the succession with the auxiliary group of gas turbines, to keep the production plant functioning almost continuously;

c) controlling the first group of gas turbines substituted in the previous phase, by subjecting it to ordinary maintenance operations;

d) substituting the second group of gas turbines of the succession with the first controlled group of gas turbines;

e) controlling the second group of gas turbines substituted in the previous phase, by subjecting it to ordinary maintenance operations;

f) repeating said phases b), c) d) and e) for all the groups of gas turbines of said succession until all the groups of the gas turbines of the plant have been subjected to control and maintenance.

According to an advantageous aspect of the present invention, during the substitution operations of the groups of gas turbines, only the group of gas turbines to be substituted is stopped from production.

According to another advantageous aspect of the pre-sent invention, during the substitution operations of the gas turbine groups, the group to be substituted to be subjected to control is only stopped for the minimum time necessary for effecting the substitution of the group.

According to a preferential aspect of the present invention, the production plant comprises four production trains.

According to another preferential aspect of the pre-sent invention, each production train of the series of trains comprises two groups of gas turbines for liquefying gas, by compression/cooling.

The characteristics and advantages of a procedure for controlling the useful life of the gas turbines of a plant according to the present invention will appear more evident from the following illustrative and non-limiting description, referring to the enclosed schematic drawings, in which.

Figure 1:
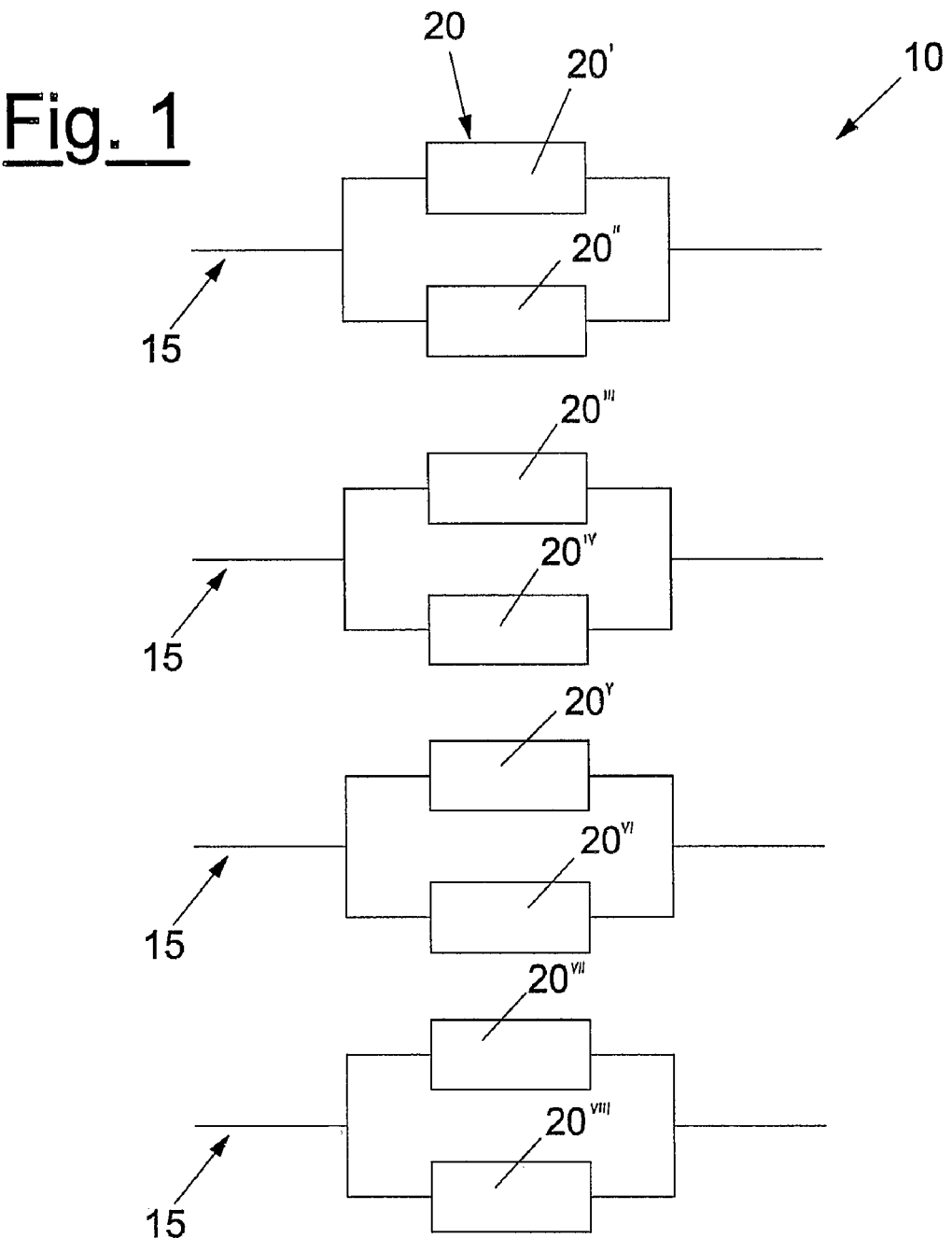
FIG. 1 is a schematic view of a liquefied gas production plant, at the moment the procedure is started.
Figure 2:
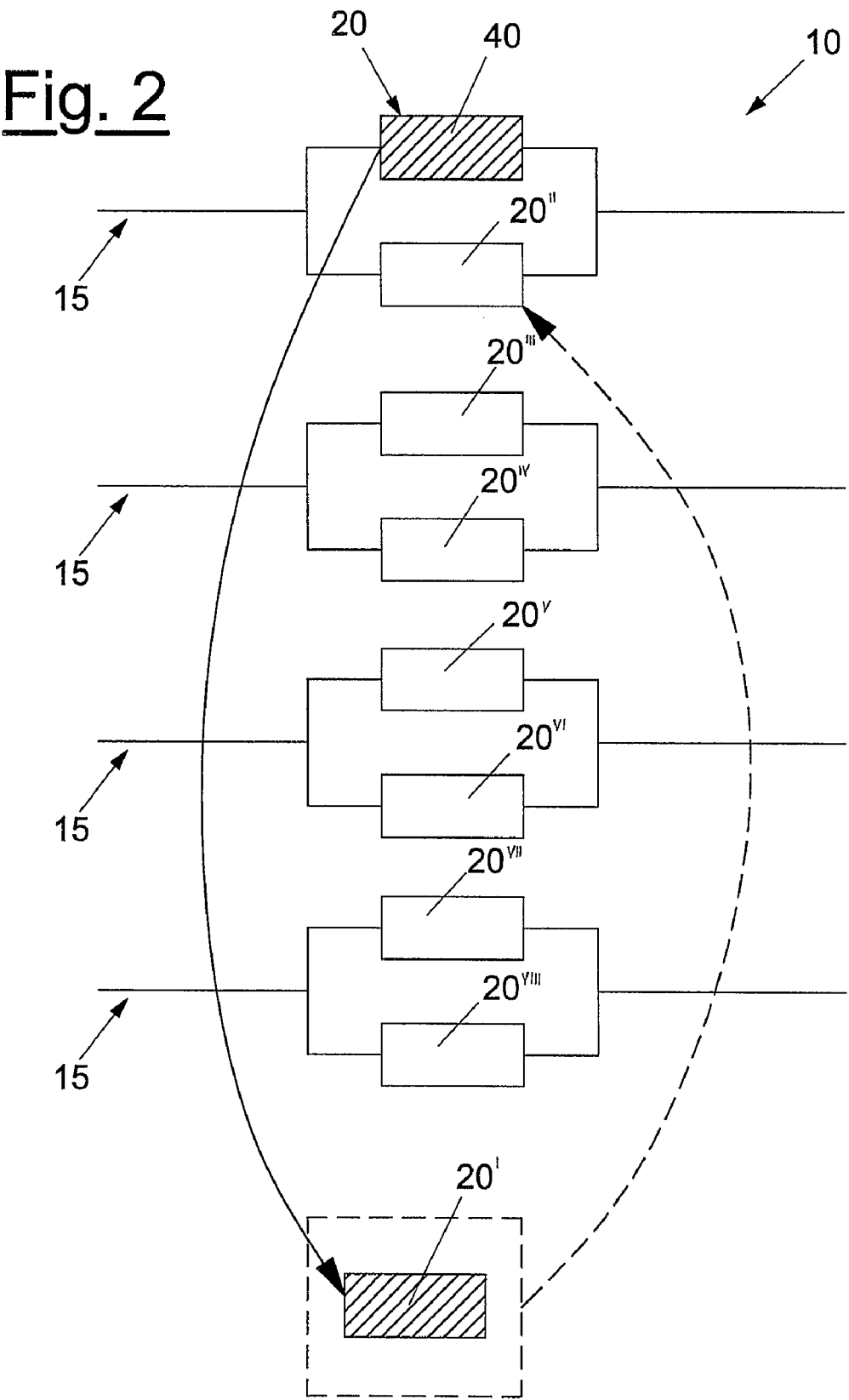
FIG. 2 is a schematic view of the plant of FIG. 1 wherein, according to the present invention, the first group of gas turbines of the first train has been substituted with the auxiliary group of gas turbines and sent for control.
Figure 3:
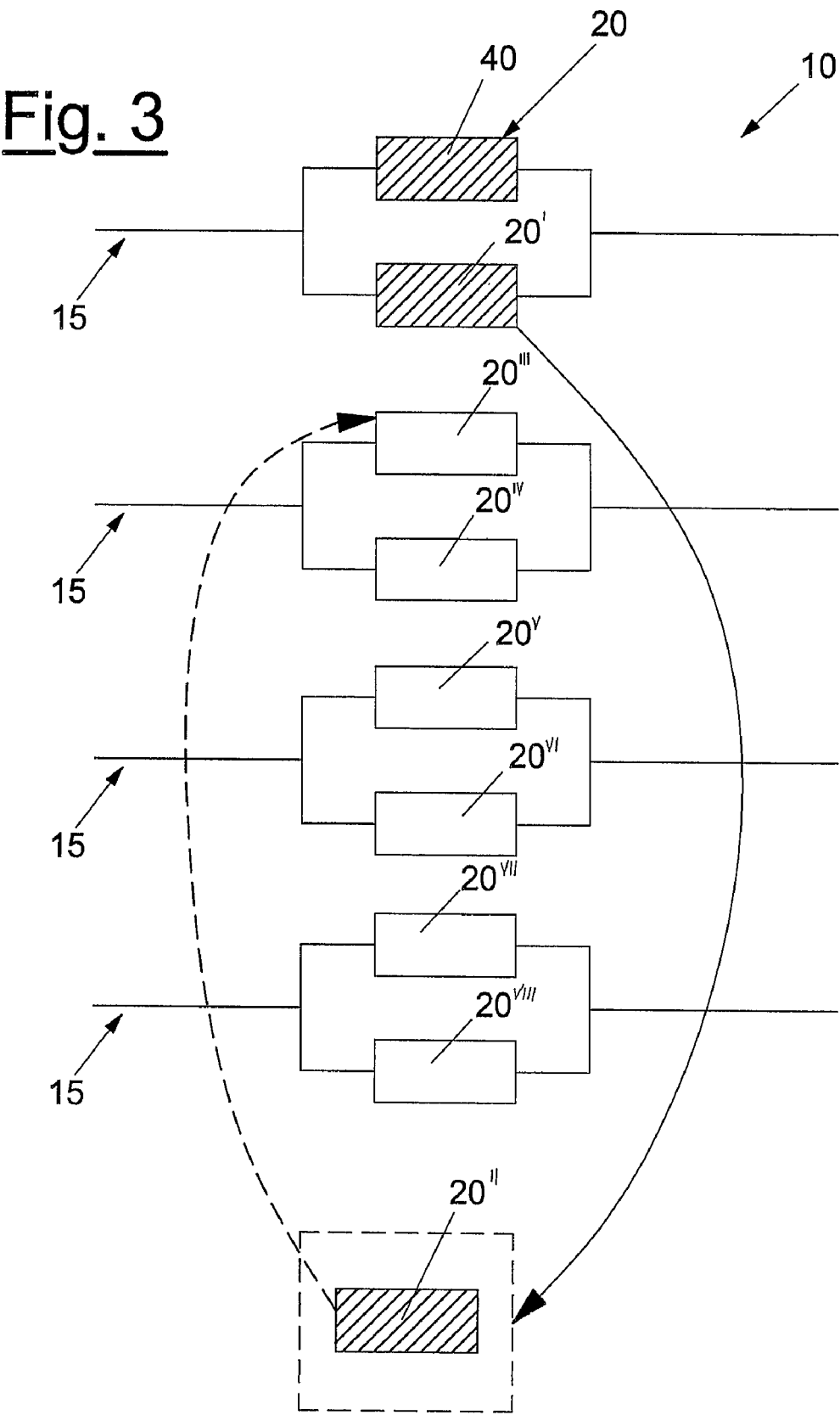
Figure 4:
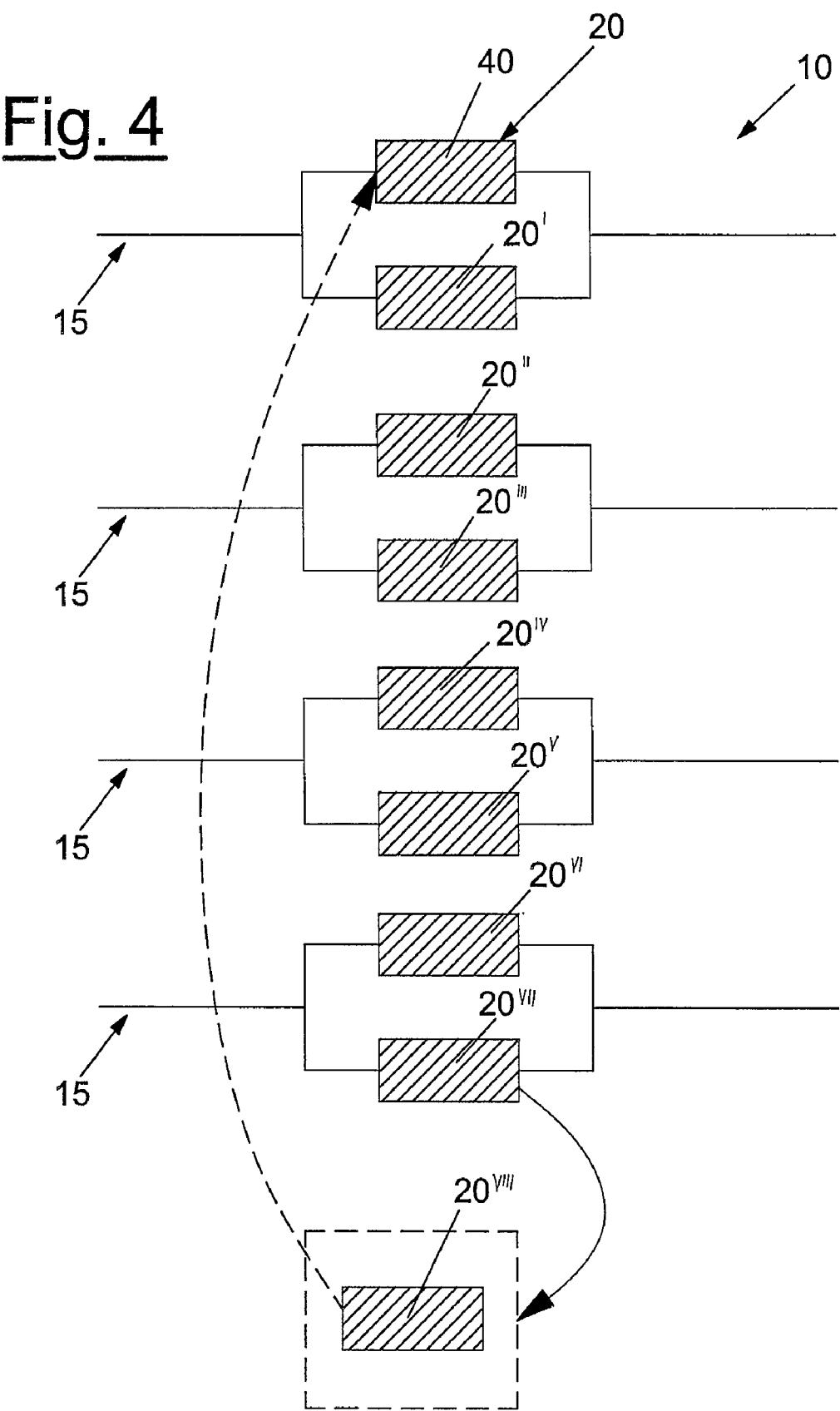
Figure 5:
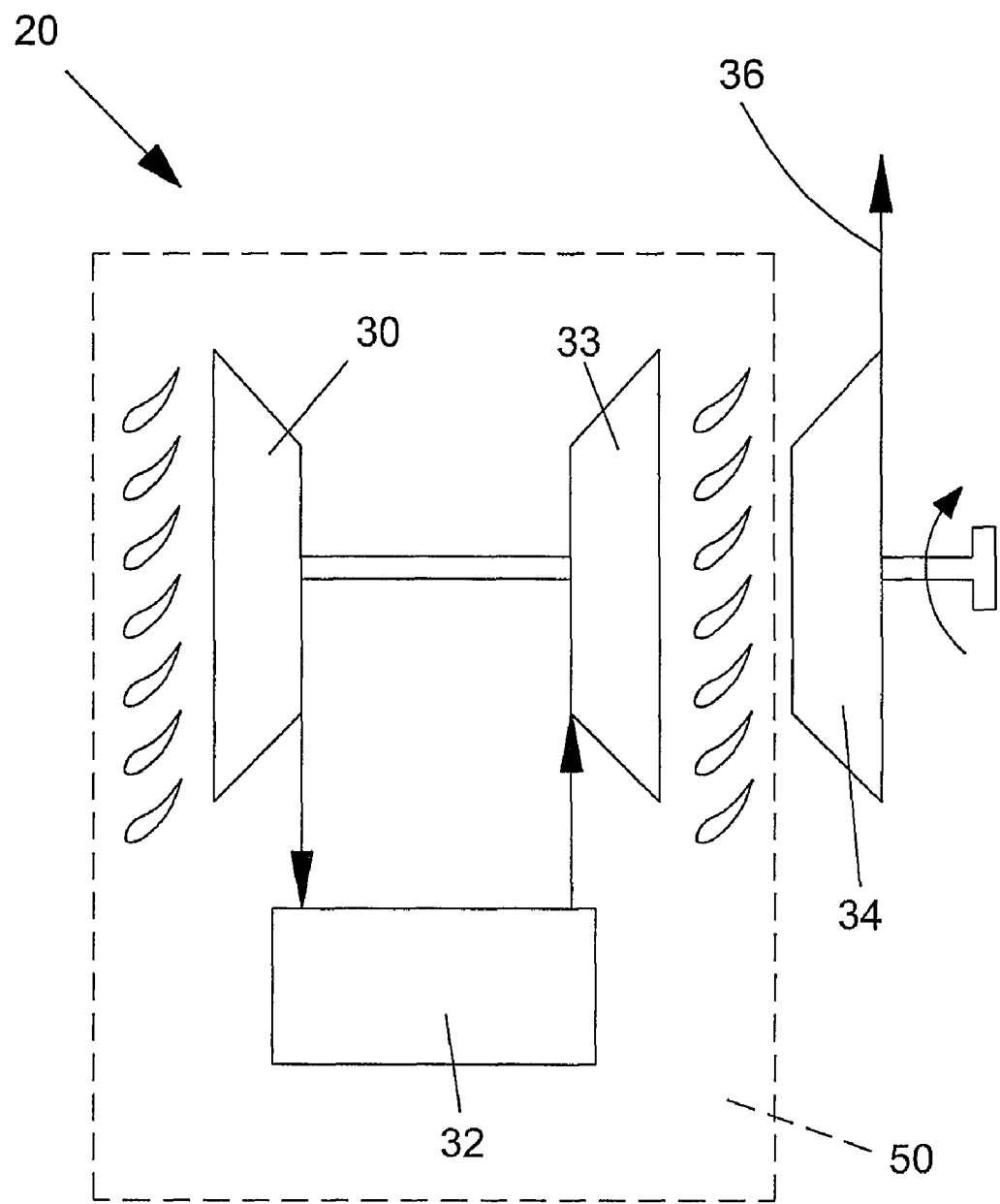

FIG. 3 is a schematic view of the plant of FIG. 1, wherein, according to the present invention, the group of gas turbines substituted in FIG. 2 has been controlled and substitutes the second group of gas turbines of the first train, the latter having been sent for control; and FIG. 4 is a schematic view of the plant of FIG. 1 wherein, according to the present invention, all the groups of gas turbines have been controlled and subjected to maintenance;

FIG. 5 is a schematic view of a gas turbine.

With reference to FIGS. 1-4, these show a production plant 10 for the production of liquefied gas.

According to the present invention, reference is made, in particular, to a procedure for controlling the useful life of the gas turbines of a production plant 10 equipped with four production trains 15.

Each production train 15, in turn, consists of a series of gas turbines 20 suitable for liquefying gas, by compression/cooling.

In the preferred embodiment of the present invention illustrated in FIGS. 1-4, each train of gas turbines 15 comprises two groups of gas turbines 20.

The groups of gas turbines 20, are equipped with a series of gas turbines 30 and require a first time T1 for effecting ordinary maintenance and assembly operations of the gas generators themselves.

Again in the preferred embodiment illustrated in FIGS. 1 to 4, each group of gas turbines 20 comprises three gas turbines.

The production plant 10 also comprises an auxiliary group of gas turbines 40, which is installed and activated in the production plant 10 to maximize, as illustrated below, the production and reduce the stoppage times of the plant.

Gas turbines are machines which comprise a compressor 30 connected to a turbine 33, and wherein a combustion chamber 32 is positioned between the compressor 30 and the turbine 33.

Air from the outside environment is fed to the compressor 30 to bring it under pressure.

The pressurized air is conveyed to the combustion chamber 32 through suitable ducts, where the fuel, necessary for producing combustion, is fed, by means of one or more injectors, from a pressurized network, the purpose of said combustion being to cause an increase in the temperature and gas enthalpy.

The high temperature and high pressure gas reaches, through suitable ducts, the various stages of a power turbine 34, which transforms the gas enthalpy into mechanical energy available for a user.

The combustion gases are then discharged into the atmosphere through a discharge outlet 36.

Each gas turbine 20 comprises a gas generator (50) downstream of which there are the power stages.

The gas generator (50) comprises the compressor 30, the combustion chamber 32 and the turbine 33.

The procedure for controlling the useful life of the gas turbines of a plant, according to the present invention, comprises the following phases:

first of all, a succession is created (20', 20", 20''' . . . ) of groups of gas turbines (20) to be subjected to maintenance, in other words, the succession establishes the order in which the gas turbine groups 20 of the plant 10 are to be subjected to maintenance, see FIG. 1.

At the beginning of the procedure, the gas generator group of the first group of gas turbines (20') of the succession (20', 20", 20''' . . . ), is substituted with the auxiliary gas generator group (40), as illustrated in FIG. 2, so as to keep the production plant (10) functioning almost continuously.

The first substituted gas generator group of gas turbines (20'), is controlled, effecting ordinary maintenance operations.

The sending of the gas generator group of gas turbines 20' for control is indicated by the continuous line in FIG. 2.

At the end of the maintenance operations on the gas generator group of gas turbines 20', the latter substitutes the second gas generator group of gas turbines 20" of the succession 20', 20", 20''' . . . The discontinuous dashed line in FIG. 2 indicates the destination of the gas generator group of gas turbines 20' at the end of the control.

In other words, the first gas generator group of gas turbines (20'), at the end of the ordinary maintenance operations, substitutes the second gas generator group of gas turbines (20"), without further stoppages or periods of non-use.

The gas generator group of gas turbines 20", removed from the first train 15, is sent for control, as indicated by the continuous dashed line in FIG. 3, thus effecting normal ordinary maintenance operations also on this group.

At this point, the gas generator group of gas turbines 20", controlled and subjected to maintenance, immediately substitutes the gas generator group of gas turbines 20''', and so on.

In other words, the procedure is repeated until all the gas generator groups of gas turbines 20 of the plant 10 have been controlled, as shown in FIG. 4.

Each gas generator group of gas turbines 20 will therefore be functioning in the production plant 10 or undergoing ordinary maintenance operations.

Each gas generator group comprises at least one gas generator.

Each gas generator group preferably comprises at least a number of gas generators equal to the number of gas turbines present in the group of gas turbines.

The time which passes between the maintenance of a gas generator group of gas turbines 20 and its assembly in a production train 15, substituting another gas generator group of gas turbines 20 to be controlled, represents a loss in the productivity of the production plant 10.

According to the present invention, at the end of the ordinary maintenance operations, a gas generator group of gas turbines 20 to be controlled, immediately substitutes a subsequent gas generator group to be subjected to control.

The controlling of a gas generator group of gas turbines 20 requires an average first time T1.

The first time T1 also includes the dismantling and assembly time of the controlled gas generator group of gas turbines 20, on a production train 15.

Each gas generator group of the gas turbines 20 must be subjected to control, i.e. ordinary maintenance operations, at the most within a second time T2 pre-established in relation to the type of turbine and functioning conditions of the plant.

The procedure according to the present invention maximizes the productivity minimizing the average time Tm which passes between the end of the control of a gas generator group of gas turbines 20 and the moment in which said gas generator group of gas turbines 20, substitutes another gas generator group of gas turbines 20 of the plant 10.

Tm therefore represents the stoppage time of a gas generator group of gas turbines 20 and is consequently an index of the plant productivity losses.

The total time lost Tp is therefore equal to the difference between the second time T2 and the product of the first time T1 multiplied by the total number of gas turbine groups 20 of the plant 10.

In other words, expressed as the mathematical formula Tp=T2−(T1·n)

wherein n is the total number of gas turbine groups 20 of the plant 10.

The average time Tm is therefore equal to the total time lost Tp divided by the total number (n) of gas turbine groups 20 of the production plant 10.

In other words, expressed as the mathematical formula Tm=Tp/n.

The procedure for controlling the useful life of the gas turbines of a plant also advantageously envisages an increase in the useful life of the gas turbines themselves.

It can thus be seen that a procedure for controlling the useful life of the gas turbines of a plant, according to the present invention, achieves the objectives specified above.

Numerous modifications and variants can be applied to the procedure for controlling the useful life of the gas turbines of a plant, thus conceived, all included in the same inventive concept.

The invention claimed is:

1. A method for controlling the useful life of gas turbines of a production plant including a series of production trains and an auxiliary gas generator group, each production train of said series of trains being in turn equipped with a series of gas turbine groups, each of which in turn includes a gas generator, the method comprising:
   a) creating a succession of gas generator groups of gas turbines to be subjected to maintenance;
   b) substituting a first gas generator group of gas turbines of said succession with said auxiliary gas generator group, to keep the production plant functioning with less interruptions;
   c) inspecting the first substituted gas generator group of gas turbines, by subjecting it to ordinary maintenance operations;
   d) substituting a second gas generator group of gas turbines of said succession with said first verified gas generator group of gas turbines;
   e) inspecting the second substituted gas generator group of gas turbines, by subjecting it to ordinary maintenance operations; and
   f) repeating said steps b), c) d) and e) for all the gas generator groups of gas turbines of said succession until all the gas generator groups of the gas turbines of said production plant have been subjected to maintenance.

2. The method for controlling the useful life of the gas turbines of a plant according to claim 1, comprising:
   stoppinq, during the substitution phases of the gas generator groups of gas turbines of said succession, only the group of gas turbines to be substituted.

3. The method for controlling the useful life of the gas turbines of a plant according to claim 1, comprising:
   stopping, during the substitution operations of said gas generator groups of gas turbines, the group to be substituted only for a minimum time necessary for effecting the substitution.

4. The method for controlling the useful life of the gas turbines of a plant according to claim 1, comprising:
   substituting the second gas generator group of gas turbines at the end of step c), with the first controlled gas generator group of gas turbines 5. The method for controlling the useful life of the gas turbines of a plant according to claim 1, wherein said production plant comprises four production trains.

6. The method for controlling the useful life of the gas turbines of a plant according to claim 1, wherein each production train of said series of trains comprises two groups of gas turbines for liquefying gas by compression and/or cooling.

7. The method for controlling the useful life of the gas turbines of a plant according to claim 1, wherein each gas generator group comprises at least a number of gas generators equal to the number of gas turbines present in the group of gas turbines.

8. The method for controlling the useful life of the gas turbines of a plant according to claim 7, wherein said gas turbine is a heavy duty gas turbine.

9. The method for controlling the useful life of the gas turbines of a plant according to claim 1, wherein said gas generator comprises a power turbine and a discharge outlet.

* * * * *